Nov. 25, 1924.
G. W. SCOTT
1,516,690
AUTOMOBILE TOP
Filed Oct. 30, 1922
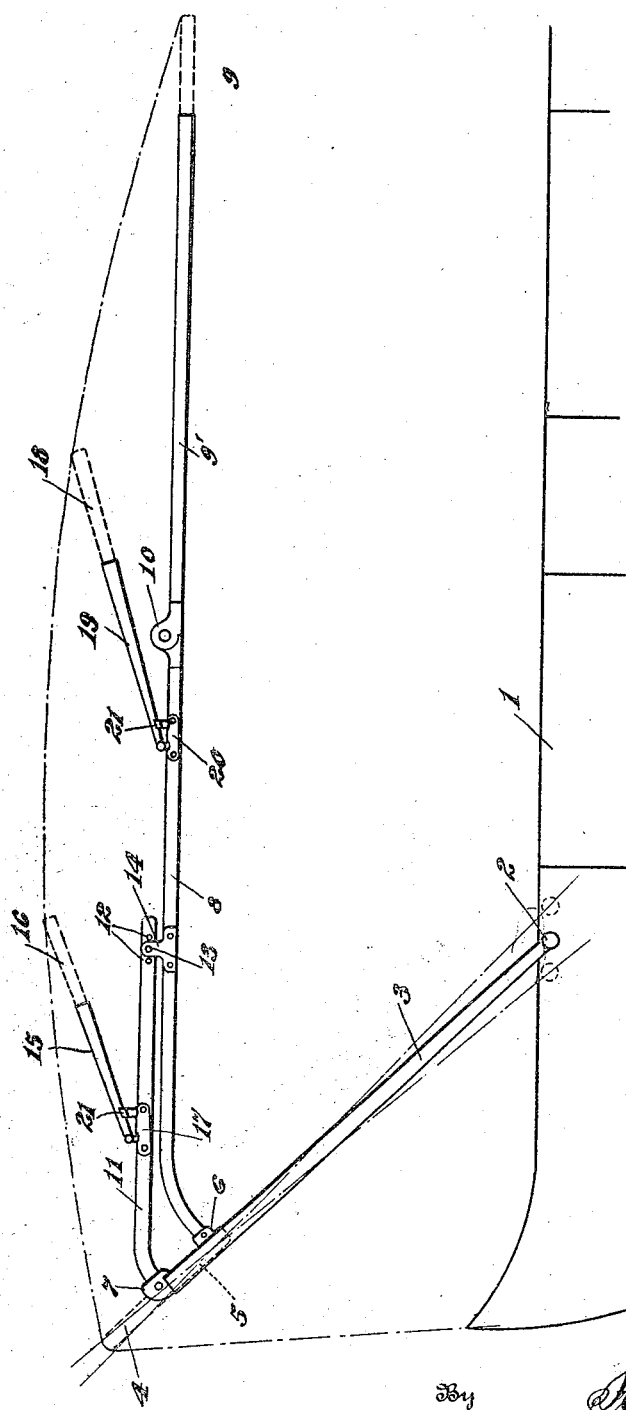
Inventor
George W. Scott
By Staley W. Bowman
Attorney Patented Nov. 25, 1924.

1,516,690

UNITED STATES PATENT OFFICE.

GEORGE W. SCOTT, OF CLEVELAND, OHIO.

AUTOMOBILE TOP.

Application filed October 30, 1922. Serial No. 597,743.

*To all whom it may concern:*

Be it known that I, GEORGE W. SCOTT, a citizen of the United States, residing at Cleveland, in the county of Cuyahoga and State of Ohio, have invented certain new and useful Improvements in Automobile Tops, of which the following is a specification.

My invention relates to improvements in automobile tops, and it particularly relates to a top of this character of the open vision or observation type.

An object of my invention is to devise a top of this character which will permit or ready attachment to various makes of vehicle tops having differently located points of attachment for the rear vertical bow of the top.

A further object of the invention is to provide simple and effective means for supporting and bracing the top structure.

A further object of the invention is to devise a top structure of the kind above referred to which will be simple in construction, economical in manufacture and effective in operation.

Referring to the drawings, the view is a side elevation showing my improvements.

In the drawing, 1 represents a vehicle body having a goose-neck or bracket 2 to which the socket 3 for the rear vertical bow is pivotally connected at its lower end in the usual way; this rear bow being the only vertical bow which is employed in the present structure. The description following is that of one side of the top structure and will apply also to the opposite side. There is secured to the inner side of the upper end of the socket 3 a bracket 5 having a pair of ears 6 and 7. To the ear 6 is pivotally connected a forwardly-extending horizontal frame member 8, to the forward end of which is connected the socket 9' of a forerigger bow 9, the connection being made by a lock joint 10 such as described in my Letters Patent 1,223,429, dated April 24, 1917. To the ear 7 is pivotally connected the rear end of a brace rod 11 the forward end of which is provided with a series of openings 13 to receive a bolt or other suitable fastening device 13 by which the forward end of the brace may be secured to a perforated upwardly projecting ear 14 secured to the side member 8. The socket 15 of a top bow 16 is pivotally connected to a saddle 17 secured to the brace 11 and another top bow 18 has its socket 19 pivotally connected to a similar saddle 20 secured to the horizontal member 8; each of these saddles being provided with a supporting member 21 upon which the respective sockets rest. The forward end of the forerigger bow 9 is attached to the windshield standards (not shown) in the usual way.

The point of location of the bracket or goose-neck 2 varies in different makes of bodies, but by my arrangement the parts of the top may be adjusted in order to accommodate these different points of attachment by locating the bolt or other fastening device 13 in the proper opening 12 in the forward end of the brace rod 11. The dotted lines indicate the different positions which the center of the vertical bow socket 3 and bow 4 would occupy in imaginary points of attachment, which illustrates how the brace 11 will be either moved forwardly or rearwardly from the position shown in the drawing. By this construction there is provided a foldable top having a minimum number of parts and one capable of being applied to different makes of bodies. The brace 11 provides a rigid support for the jointed top bow members and will prevent the structure from sagging between the ends thereof.

Having thus described my invention, I claim:

In a vehicle top for automobiles, a main rear bow extending upwardly and rearwardly, a horizontal forwardly-extending top member pivotally connected at its rear end to said main bow near the upper portion of said main bow, a forerigger bow connected with the forward end of said horizontal member, a top bow pivotally connected with said horizontal member near the forward end thereof and supported thereby, the lower ends of said main bow being capable of being attached to the vehicle body at different points in the length of said body, and to swing about its pivotal connection with said horizontal member to compensate for different inclinations, a brace member pivotally connected to the upper end of said main bow and extending forwardly, means for adjustably connecting the forward end of said brace member with said horizontal member, and a second top bow pivotally connected with said brace member and supported thereby.

In testimony whereof, I have hereunto set my hand this 26th day of October 1922.

GEORGE W. SCOTT.